United States 1

Naito

Re. 28,969

Sept. 21, 1976

[54] INTEGRAL RECLOSABLE BAG

[75] Inventor: Kakuji Naito, Tokyo, Japan

[73] Assignee: Kabushiki Kaisha Seisan Nihon Sha, Ltd., Tokyo, Japan

[22] Filed: Sept. 30, 1975

[21] Appl. No.: 618,165

Related U.S. Patent Documents

Reissue of:

[64] Patent No.: 3,198,228
Issued: Aug. 3, 1965
Appl. No.: 233,959
Filed: Oct. 29, 1962

[30] Foreign Application Priority Data

Nov. 27, 1961 Japan ..... 36-42167

[52] U.S. Cl. ..... 150/3
[51] Int. Cl.² ..... B65D 33/24
[58] Field of Search ..... 150/3; 24/201 C

[56] References Cited

UNITED STATES PATENTS

| | | | |
|---|---|---|---|
| 2,144,755 | 1/1939 | Freedman | 24/201 C |
| 2,355,816 | 8/1944 | Morner | 24/201 C |
| 2,581,604 | 1/1952 | Roehrl | 24/201 C |
| 2,606,352 | 8/1952 | Wende | 24/201 C |
| 2,674,289 | 4/1954 | Silverman | 150/3 |
| 2,823,720 | 2/1958 | Svac et al. | 150/3 |
| 2,909,822 | 10/1959 | Botti | 24/201 C |
| 2,994,117 | 8/1961 | McMullin | 24/201 C |

FOREIGN PATENTS OR APPLICATIONS

| | | | |
|---|---|---|---|
| 212,242 | 5/1960 | Austria | 24/201 C |
| 564,633 | 2/1958 | Belgium | 24/201 C |
| 1,031,136 | 3/1953 | France | 24/201 C |
| 1,132,628 | 3/1957 | France | 24/201 C |
| 1,168,794 | 9/1958 | France | 24/201 C |
| 1,063,361 | 8/1959 | Germany | 24/201 C |
| 537,083 | 12/1955 | Italy | 24/201 C |
| 35-22217 | 7/1960 | Japan | 24/201 C |
| 102,270 | 8/1962 | Netherlands | 24/201 C |

*Primary Examiner*—Donald F. Norton
*Attorney, Agent, or Firm*—Hill, Gross, Simpson, Van Santen, Steadman, Chiara & Simpson

[57] ABSTRACT

*A reclosable plastic bag having interlocking rib and groove elements integral with the plastic of the bag formed with an arrowhead shaped rib. The rib and groove are structurally interrelated in different forms so that the bag opens easily from the outside and resists opening from the inside.*

7 Claims, 11 Drawing Figures

Fig. 1.
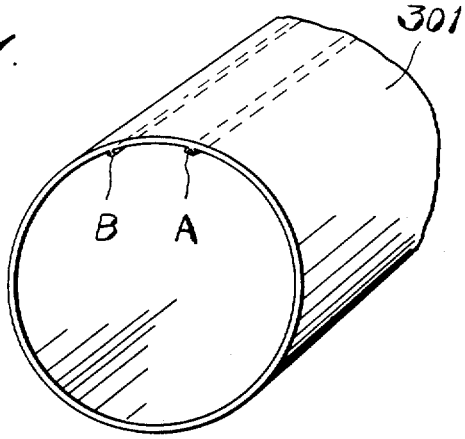
Fig. 2.
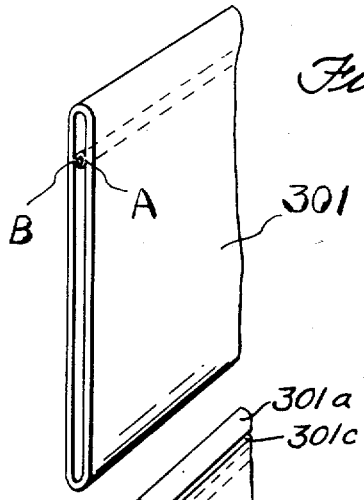
Fig. 3.
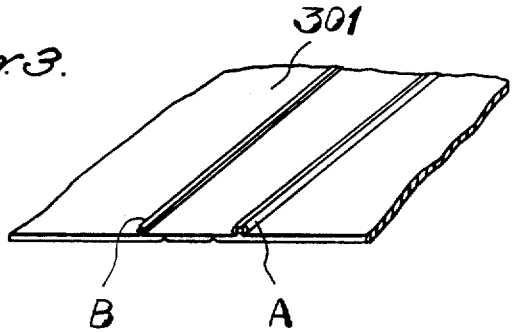
Fig. 4
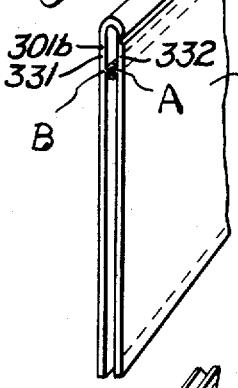
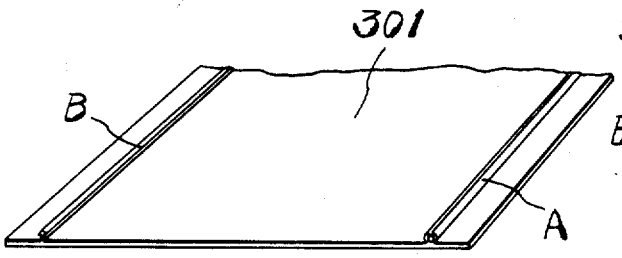
Fig. 5.
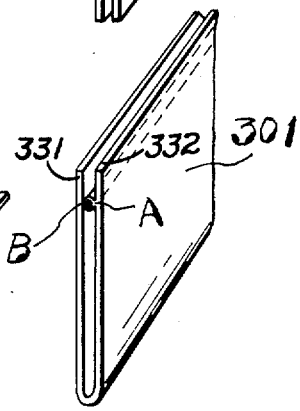
Fig. 6.
INVENTOR.
KAKUJI NAITO
BY
ATTORNEY

INVENTOR.
KAKUJI NAITO
BY
ATTORNEY

INTEGRAL RECLOSABLE BAG

Matter enclosed in heavy brackets [ ] appears in the original patent but forms no part of this reissue specification; matter printed in italics indicates the additions made by reissue.

This application is a continuation-in-part of my copending application, Ser. No. 89,540, filed Feb. 15, 1961.

This invention relates to a synthetic resin film-made bag material compositely comprising occludent means. Particularly this invention relates to an improvement in such occludent means.

Various types of occludent means which can be used as sealing devices for synthetic resinous film-made bags have been proposed heretofore. In the prior art, however, no attention was paid to the force required for the engagement of occludent means and that required for the disengagement of the same as well as a strength required for holding the contents of a bag, and therefore there has never been known satisfactory occludent means which is designed taking these three factors into consideration.

As a result of my studies it has been possible to provide the occludent means for a synthetic resinous film-made bag material in which the requirement concerning the above factors are met. Thus, this invention is concerned with an improvement in a synthetic resinous film-made bag compositely comprising occludent means consisting of a male rib and a female rib placed integrally inside the bag material, the means being such that it is ready for engagement between the male and female ribs by pressing them with fingers, has a sufficient strength to retain the contents safety within the limits of the strength of the bag film, and is also ready for disengagement by pulling with fingers.

The female rib which is provided compositely with a bag material is made of the same synthetic resin as said material, and has a cross section of circular, elliptic or polygonal shape. The male rib has an axial body, the top of which is arrowhead-shaped in cross section and the width is a little greater than the opening of the female rib. The top of the male rib as well as that of the female rib is made moderately round, and the individual parts of both of the male and female ribs are arranged to have such thickness that they provide a fastening strength, when the male and female ribs are engaged, consistent with the strength of the bag film.

In opening the occludent means of the present invention, the bag material is provided with a strength which is less than the force required to open the bag occludent means from internally of the bag due to the pulling force applied to the bag walls resulting from falling, tumbling or shock. The force required to internally open the occludent means of the bag is about five times greater than the force required to externally open the occludent means. Accordingly, the bag is readily opened to have contents loaded therein, and after closing the bag, it will always remain closed with resistance against said internal force at least until the bag film is broken.

The invention will be more readily apparent from the following detailed description taken in conjunction with the accompanying drawings in which:

FIG. 1 is a perspective view showing a cylindrical film provided with occludent means of the present invention;

FIG. 2 is a plan showing a bag material in which the occludent means of FIG. 1 is interlocked;

FIG. 3 is a perspective view showing a planar film provided with occludent means;

FIG. 4 is a side elevation showing the occludent means of FIG. 3 where they are interlocked;

FIG. 5 is a perspective view showing a planar film provided with occludent means at both ends;

FIG. 6 is a perspective view showing the interlocking state of the occludent means of FIG. 5;

Figure 7:
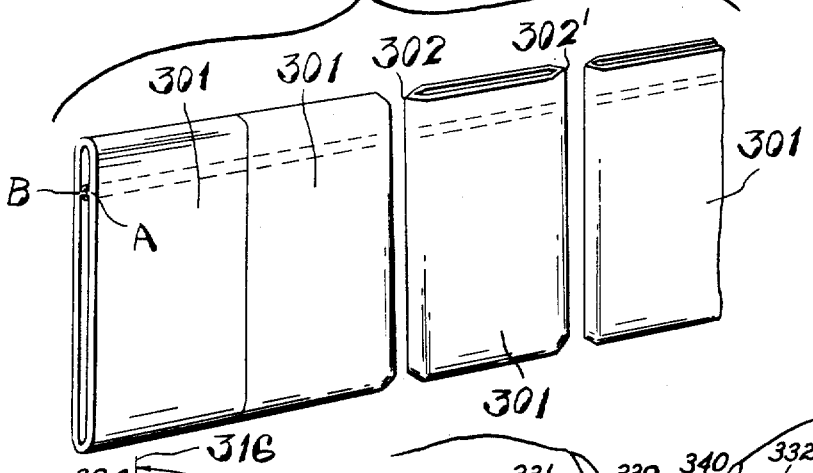
FIG. 7 is a perspective view showing a film with occludent means where the film is processed by cutting.
Figure 8:
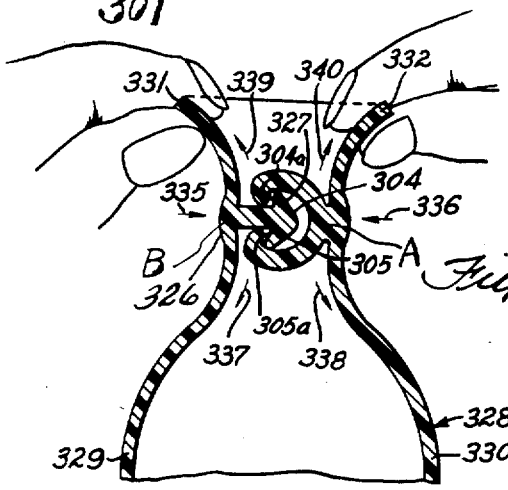
FIG. 8 is an explanatory sectional view showing the opening and closing of a bag of this invention and also showing forces applied to the occludent means.

In FIG. 1 which concerns a synthetic resinous film-made bag material of cylindrical shape, a female rib A and a male rib B( which also may be termed a groove element A and a rib element B respectively) for the occludent means are provided compositely inside the cylindrical bag material 301. Where a planar film is concerned, as shown in FIG. 3, FIG. 5 and FIG. 7, these female and male ribs are provided compositely on one surface of this film. FIG. 2, FIG. 4 and FIG. 6 show the folded state of the bag material of FIG. 1, FIG. 3 and FIG. 5 respectively. The engagement of the female and male ribs in the occludent means is shown in FIG. 8. The female rib A and the male rib B usually are pressed with fingers at the positions 315 and 314 respectively from both exterior sides of the bag whereupon both edges 304, 305 of the male rib B come into contact with the hooks 306, 307 of the female rib A. In response to the increase in the degree of pressing, the extremities of the hooks 306, 307 are flexed slightly, while the female rib body is forced open in the outward direction. Then the edges 304, 305 of the male rib B (FIG. 9) are flexed and they advance until the edges are caught by the hooks or extremities 306 and 307 of the female rib A. The axial part 308 of the male rib is inserted into the space 309 between the hooks 306, 307 of the female rib and thereafter these hooks are returned to their original positions to insure tightening closely. In order to have the complete engagement between the female and male ribs over long length of the occludent means, this means is pressed at its one end 302 of the bag material between fingers, and then while effecting pressing, it is squeezed between fingers along the longitudinal direction, whereby overall parts of the male and female ribs of the occludent means are engaged by insertion into one another.

Such engagement as explained above, of course, is effected for holding a material within the synthetic resinous film-made bag or sealing the bag containing the material therein. Because of a variety of materials to be held, however, a film which has a suitable strength to keep the material safe should be selected. In order for accomplishing the intended purpose, such an engagement strength which is necessary and sufficient for the occludent means of the invention is required in the correlation to the strength of the bag film.

The strength of such synthetic resinous film may concern with tensile strength, elongation, tear strength, pressure resistance, impact strength, etc., and as a result of my experiment relating to the strength of polyethylene film customarily used as wrapping, the data are set forth in the following table.

| Sample No. | 1 | 2 | 3 | 4 | 5 |
|---|---|---|---|---|---|
| Thickness, mm | 0.03 | 0.04 | 0.05 | 0.06 | 0.07 |
| Tensile Strength, kg./20 cm | 1 | 1.3 | 1.6 | 2.0 | 2.35 |
| Drop shock, cm | .80 | 110 | 150 | 200 | 260 |

The data of this table indicate that the strength of a bag film, if processing conditions for the film are proper, will be in proportion to the thickness of the said film.

Now the interlocking strength of the occludent means will be explained in relation to the strength of the film. First, such interlockjing strength may be considered as being concernable with the following components:

(I) Engagement strength of the occludent means which is to be greater than an ultimate strength at which a bag film is broken when the contents of a bag are subjected to external pressure, tumbling, impact, etc., said contents being enclosed in the bag by fastening the occludent means.

(II) Insertion drag which is to be in such a degree that it permits complete insertion of the male rib into the female one when pressure for the engagement is applied along a line from one end to another by pressing with fingers.

(III) Disengagement drag which is to be in such a degree that it permits easy release of the male rib from the female one by exteriorly pulling with fingers.

Figure 9:
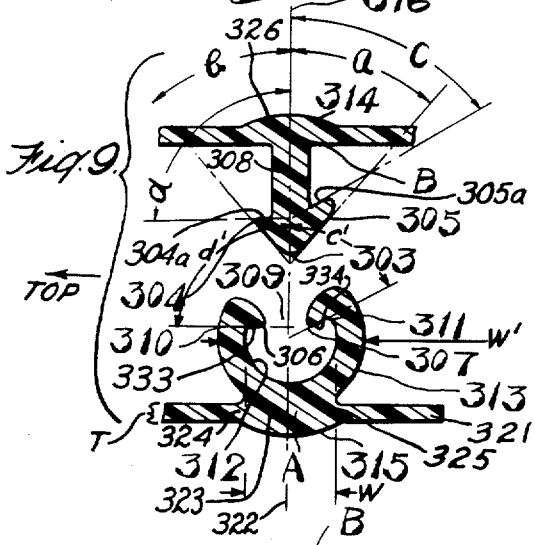
FIG. 9 is an enlarged sectional view showing the male and female parts of the occludent means of the present invention.

Among these components of the interlocking strength, (I) and (III) are in the direct relation to the strength of the bag film. In my practical tests, as shown in FIG. 8, the opposite film parts or flanges which extend upwardly from the male rib and the female rib are pulled in the opposite directions by fingers gripping the flanges, whereby pulling force is transmitted to both of the male and female ribs. Thereupon, as shown in FIG. 9, the engagement between the edge 304 of the male rib and the hook of the female rib 306 is released through elongation and slight exterior inclination of the male rib body, and while pulling is further continued, the male rib and the female one are separated from one another over a length extending from one end to the other of the bag material, until the closure is completely opened. As a result of my tests, it has been found that a force for opening or the strength between the male and female ribs of the occludent means may suitably be from about 200 g. to 800 g. (maximum load before the release). This means that even a film having the thickness of 0.03 mm. can be satisfactorily used in the present invention because this film has a film strength of 1000 g. as shown in the preceding table.

From the commercial and economical points of view, there are some requirements to be considered: The occludent means should have an interlocking strength (I) necessary and sufficient for safely holding the contents of said bag: this occludent means should have an insertion drag and a disengagement resistance both of which are necessary but minimum power for engagement and opening respectively; and the occludent means, as long as it has a required strength, should be of minimum size and weight.

As mentioned before, there is a great variety in the type of contents as well as in the shape or dimension of bags and the thickness of films used therefor. The resistance of the occludent means against separation should be equal to or slightly higher than the tensile strength of the film concerned. Thus, by taking into consideration the factors (I), (II) and (III) in combination with the resistant power of the film, a satisfactory bag material with the occludent means can be provided.

As a result of my extensive preliminary tests, I designated (I) 2000 g. (II) 400 g. and (III) 400 g. as the suitable components of an interlocking strength for customarily used polyethylene wrapping film having a thickness of 0.05 mm. and a tensile strength of 1600 g.

In this case, fine size, lightweight occludent means was obtained, which had the following specification. The male and female ribs of the occludent means had a weight of 1.2 g. per 1 m. long, and when the occludent means was fastened, the clearance between the outer side 315 of the female rib A and that 314 of the male rib B (FIG. 9) was about 1.14 mm. The male rib B of this occludent means was designated as follows: Based on the axial center line 316, the outward inclinations (b and a) of the edges 304, 305 was about 35° to 45°, the inward inclination (c) of the edge 305a about 55° to 65° and the inward inclination (d) of the edge 304a about 80° to 90°. The width of the stem 308 of the male rib B is about5/15 mm. and the edges 304, 305 are about 10/15 mm. wide. The distance from the edge 305 to the top 303 was about 6/15 mm. and that from the outer side 314 of the male rib B to the top of the arrowhead-shaped part is about 13/15 mm. Lines 304 and 305 are drawn along the surfaces of the male rib. The point at which lines 304 and 305 intersect is spaced from the edge point 303 by 3/15 mm. The female rib A was shaped in cup form which had two hooks inside. One 306 of these hooks was inwardly flexed at the point 310 and the other 307 was at the position 311. The inclinations of these hooks to the female rib body were determined so as to correspond to each angle a, b, c and d of the male rib B. The thickness of the female rib body confined between the curved inner side 312 and the outer side 313 is about 3.3/15 mm. The clearance 309 of the inwardly flexed hooks 306, 307 was 7/15 mm. The positions 310, 311 at which the hooks of both sides were flexed were apart from the bottom of the cup by 8/15 mm. In such a situation where the extremities of the edges 304, 305 of the male rib B came into contact with the bottom of the female rib A, the clearance between the outer part 314 of the male rib B and that 315 of the female rib A was about 17/15 mm.

The above-specified data concerning angle, thickness, length, etc. of individual parts show one embodiment for obtaining necessary and sufficient mechanical characteristics in connection with No. 3 film of 0.03 mm. thickness in the preceding table, and at the same time they also show desirable proportion of the individual parts of occluding means as well as of its interlocking structure per se.

For instance, even when the load within a bag is temporarily concentrated, due to impact, to the inside of the male rib or the part extending from the male rib extremity 305 to the root of the stem or axis 308 as well as the part extending from the engaged female rib flexed part 311 to the extremity 307, any part of the arrowhead part 305 of the male rib and the center part 309 of the female rib do not reach their yielding point. Now, by varying the weight of the occludent means, it can provide various interlocking strengths which are in proportion to said weight.

| Sample No. | 1 | 2 | 3 | 4 | 5 |
|---|---|---|---|---|---|
| Weight of the interlocking part (g./m.) | 0.6 | 1.9 | 1.2 | 1.5 | 1.8 |
| Tensile Strength (kg/20mm/in): | | | | | |
| Interior | 1 | 1.5 | 2 | 2.5 | 3 |
| Exterior | 2 | 0.3 | 0.4 | 0.5 | 0.6 |

In this table, the term "interior" means the inner part of the bag material and the term "exterior" means the outer part of the same. Thus, (I) and (III) as mentioned hereinbefore may be equalized to the interior and exterior tensile strength respectively which may be expressed in the maximum load required for the separation between the edge 304 of the male rib B and the hook 306 of the female rib A as well as between the edge 305 of the male rib B and the hook 307 of the female rib A by their individual elongation in response to the load which results by pulling two sheets of the films in the opposite direction as shown in FIG. 8

Figure 10:
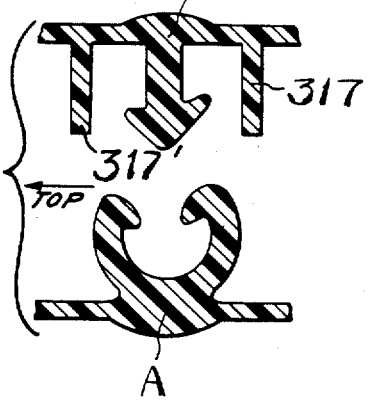
FIG. 10 is a sectional view showing one modification in the male part of FIG. 9.
Figure 11:
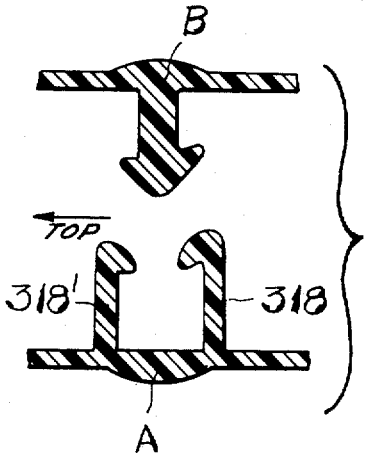
FIG. 11 is a sectional view showing another modification in the female part of FIG. 9.

It is apparent from this table and the just precedent table, that the data can be considered in combination with reference to the same sample number. For example, No. 1 occludent means having a weight of 0.6 g./m. can be combined for No. 1 film having a thickness of 0.03 mm. In the combination thus obtained, the occludent means can provide a necessary and sufficiently strength and a minimum weight for the film having a specific thickness, and in this case it can be confined that with respect to the strength of the occludent means the ratio between the exterior one and the interior one is about 1:5. In the above-indicated tables, of course, there are equalized values in data between each of No. 1 to No. 5. According to the above-explained principles of the invention, it is, of course, possible to have some changes in the shape of female ribs, for example, into elliptic or polygonal shape, or in angle and length of any parts of male or female ribs in response to the specific gravity, stiffness (or softness), mechanical strength, etc. of films used. Furthermore, supporting rails 317, 317' (FIG. 10) may be provided at both sides of male ribs in order to support the ribs. In addition, there may be provided foot parts which can be inclined left and right to increase mechanical strength between the outer bottom part of female rib and the main body of film. It is also possible to design female ribs in rail shape 318, 318' in which the male rib can be sustained (FIG. 11).

As shown in the drawings the female rib A has a stem or neck 320 connecting the jaws 312 and 313 to the supporting wall 321 with a thickened portion 323 forming part of the neck. The thickened portions 323 and 326 are illustrated only in the enlarged detail of the ribs. FIGS. 8–11, and are omitted for ease of illustration in FIGS. 1–7. As may be seen in FIG. 9, the width W of this neck is less than the overall width W' of the jaws but greater than the thickness T of the supporting wall at the sides of the rib. Essentially the neck 320 of the thickness W shown does not bend so that a neck would not be necessary but if the neck or base 320 were too broad bending would occur too far from the axial center 322 of the rib A increasing the moment arm and increasing the tendency of bending to separate the male and female ribs. Bending will occur at the edges 324 and 325 of the thickened portion 323 at the base of the female rib A, and these locations 324 and 325 are within the outer limits (the width W') of the rib A. The thickened portions 323 and 326 do not merely reinforce the bag wall but establish a bending location preventing distorting stresses from occurring in the ribs A and B when they bend relative to the bag walls and this portion also holds the ribs A and B at right angles to the walls at the time the plastic is extruded, since they will tend to bend when the plastic is still soft. The ribs A and B are at right angles to these supporting walls for ease of joining and improved holding.

In summary, as shown in the drawings and particularly FIGS. 8 and 9, the bag body 328 has flexible walls 329 and 330 formed of a plastic film. The bag body 328 has an opening therein closable by releasably interlocking rib and groove elements B and A which are integral with the walls 329 and 330 and formed of the resilient material of the walls. The rib and groove elements B and A are separable by drawing the elements apart and interlockable by pressing the elements together by the application of forces indicated generally by the arrows 335 and 336.

The bag has external flanges 331 and 332 on the upper exposed edges of the walls 329 and 330 which may be gripped and drawn apart to separate the elements by the application of forces laterally outwardly indicated somewhat generally by the arrowed lines 339 and 340. The contents of the bag acting outwardly on the walls 329 and 330 also tend to apply a separating force to the rib and groove elements B and A indicated generally by the arrowed lines 337 and 338.

The external flanges 331 and 332 may be initially on the bag top as shown in FIG. 6, or the flanges may be initially interconnected by a doubled portion 301a, FIG. 4. Tear lines of weakened resistance 301b and 301c located at the upper edge of the flanges 331 and 332 interconnect the flanges with the doubled portion. The doubled portion can be torn off to expose the flanges for gripping.

The rib element B is arrowhead shaped. The groove element is provided with a groove 312 to receive the arrowhead and may in one form have side hook members 310 and 311. On the side hook members are engaging surfaces 333 and 334. The arrowhead shaped rib element also has engaging surfaces 304a and 305a which are on the base of the rib element. The engaging surfaces of the groove element A and of the rib B provide interengaging surfaces when the rib and groove elements are interlocked as indicated in FIG. 8 and forces tend to separate the elements. The rib element has engaging surface 304a which extends upwardly toward the outside of the bag, and has engaging lower surface 305a which extends downwardly toward the inside of the bag. As will be observed, a number of the structural elements coact both independently and cooperatively so that the bag opens relatively easily from the outside by pulling apart the flanges 331 and 332 and resists opening from the inside from the forces on the walls 329 and 330.

These structural features include providing the upper engaging surface 304a of the rib element B shorter than the lower engaging surface 305a. Also, the angle d between the center line 316 of the stem 308 of the rib element B and the surface 304a is larger than the angle c between the stem center line 316 and the lower engaging surface 305a. The angle d between the center line 316 and the upper surface 304a is preferably in the range of 80° to 90° while the angle c between the center line 316 and the lower surface 305a is preferably in the range of 55° to 65°. In a preferred form the engaging surfaces 333 and 334 of the groove element have the same, or a complementary angle, to the surfaces 304a and 305a respectively of the rib element. As shown on FIG. 9, the engaging surface 334 is at an angle c′ with the axial center 322 (which is shown coincident with the center line 316 of the stem). The engaging surface 333 is at angle d′ with the center line 322. The angle d′ is greater than the angle c′. As stated above, the groove element in one form has hook members 310 and 311 with the hook member 311 carrying the lower engaging surface 334 being longer than the hook member 310 carrying the upper engaging surface 333.

I claim:

1. A reclosable flexible container comprising, a bag body having flexible walls formed of a plastic film having an opening therein, releasably interlocking rib and groove elements integrally part of the walls on facing inner surfaces thereof formed of a resilient material and separable by drawing the elements apart and interlockable by pressing the elements together, external flanges on the upper exposed edges of said walls which may be gripped and drawn apart to separate said elements, said rib element being arrowhead shaped with the rib and groove elements having interengaging upper surfaces extending toward the outside of the bag and interengaging lower surfaces extending toward the inside of the bag with the upper engaging surface of the rib element being shorter than the lower engaging surface of the rib element so that the bag opens relatively easily from the outside and resists opening from the inside, said rib element surfaces being on the base of the arrowhead shaped rib element.

2. A reclosable flexible container comprising, a bag body having flexible walls formed of a plastic film having an opening therein, releasably interlocking rib and groove elements integrally part of the walls on facing inner surfaces thereof formed of a resilient material and separable by drawing the elements apart and interlockable by pressing the elements together, external flanges on the upper exposed edges of said walls which may be gripped and drawn apart to separate said elements, said rib element being arrowhead shaped with the rib and groove elements having interengaging upper surfaces extending toward the outside of the bag and interengaging lower surfaces extending toward the inside of the bag with the angle between the center line of the stem of the arrowhead and the upper engaging arrowhead surface being larger than the angle between the stem center line and the lower engaging arrowhead surface so that the bag opens relatively easily from the outside and resists opening from the inside.

3. A reclosable flexible container in accordance with claim 2 wherein said angle between the center line of the stem of the arrowhead and said upper arrowhead engaging surface lies within the range of 80° to 90° and the angle between the stem center line and the lower arrowhead engaging surface lies in the range of 55° to 65°.

4. A reclosable flexible container comprising, a bag body having flexible walls formed of a plastic film having an opening therein, releasably interlocking rib and groove elements integrally part of the walls on facing inner surfaces thereof formed of a resilient material and separable by drawing the elements apart and interlockable by pressing the elements together, external flanges on the upper exposed edges of said walls which may be gripped and drawn apart to separate said elements, said rib element being arrowhead shaped with the rib and groove elements having interengaging upper surfaces extending toward the outside of the bag and interengaging lower surfaces extending toward the inside of the bag with the upper engaging surface of the rib element being shorter than the lower engaging surface of the rib element and with the engaging surfaces of the groove element having the same angle as the engaging surfaces of the rib element so that the bag opens relatively easily from the outside and resists opening from the inside, said rib element surfaces being on the base of the arrowhead shaped rib element.

5. A reclosable flexible container comprising, a bag body having flexible walls formed of a plastic film with an upwardly facing opening, releasably interlocking rib and groove elements integrally part of the walls on facing inner surfaces thereof formed of a resilient material and separable by applying a force directly to the walls drawing the elements apart and interlockable by pressing the elements together, and external flange means on the upper exposed edges of said walls which may be gripped and drawn apart to separate said elements, said rib element being arrowhead shaped with the rib and groove elements having interengaging upper surfaces extending toward the outside of the bag and interengaging lower surfaces extending toward the inside of the bag, said groove element having *two* side hook members [ carrying the engaging surfaces of the groove element with the hook member carrying the lower surface of the groove element being longer than the hook member carrying the upper surface of the groove element so that the bag opens relatively easily from the outside and resists opening from the inside.] , *each projecting downwardly toward its associated wall so that one locks at each side of the rib element with the one inside the bag being longer than the other and each having a locking surface being at an angle less than 90° with a line drawn through the center line of the rib and groove elements so that the bag opens more easily from the outside than the inside.*

6. A reclosable flexible container comprising, a bag body having flexible walls formed of a plastic film, releasably interlocking rib and groove elements integrally part of the walls on facing inner surfaces thereof formed of a resilient material and separable by drawing the elements apart and interlockable by pressing the elements together, external flanges on the upper exposed edges of said walls which may be gripped and drawn apart to separate said elements, said external flanges being interconnected by a doubled portion with tear lines of weakened resistance at the upper edges of the flanges so that said doubled portion can be torn off to leave the flanges exposed and separated, said rib element being arrowhead shaped with the rib and groove elements having interengaging upper surfaces extending toward the outside of the bag and interengaging lower surfaces extending toward the inside of the bag with the upper engaging surface of the rib element being shorter than the lower engaging surface of the rib element so that the bag opens relatively easily from the outside and resists opening from the inside, said rib element surfaces being on the base of the arrowhead shaped rib element.

7. A reclosable flexible container comprising, a bag body having flexible walls formed of a plastic film having an opening therein, releasably interlocking rib and groove elements integrally part of the walls on facing inner surfaces thereof formed of a resilient material and separable by drawing the elements apart and interlockable by pressing the elements together, external flanges on the upper exposed edges of said walls which may be gripped and drawn apart to separate said elements, said rib element being arrowhead shaped with the rib and groove elements having interengaging upper surfaces extending toward the outside of the bag and interengaging lower surfaces extending toward the inside of the bag with the angle between the center line of the rib and groove elements and the upper engaging groove element surface being larger than the angle between the center line of the rib and groove elements and the lower engaging surface of the groove element so that the bag opens relatively easily from the outside and resists opening from the inside [.], *the flexible wall supporting the groove element having a thickened portion opposite where the groove element is mounted, said thickened portion supporting the groove element at right angles to the wall.*

* * * * *